United States Patent
Matsumoto et al.

(10) Patent No.: US 6,904,488 B2
(45) Date of Patent: Jun. 7, 2005

(54) PORTABLE ELECTRONIC DEVICE COMPRISING COMMON SERIAL BUS CONNECTOR

(75) Inventors: Katsuyuki Matsumoto, Hirakata (JP); Masanao Yoshida, Osaka (JP)

(73) Assignees: Sanyo Electric Co., Ltd., Moriguchi (JP); Sanyo Technosound Co., Ltd., Daito (JP)

( * ) Notice: Subject to any disclaimer, the term of this patent is extended or adjusted under 35 U.S.C. 154(b) by 301 days.

(21) Appl. No.: 09/741,018

(22) Filed: Dec. 21, 2000

(65) Prior Publication Data

US 2001/0005641 A1 Jun. 28, 2001

(30) Foreign Application Priority Data

Dec. 27, 1999 (JP) .......................................... 11-370327

(51) Int. Cl.[7] .............................................. G06F 13/20
(52) U.S. Cl. .................... 710/313; 710/305; 710/73; 713/320; 713/324; 713/340; 713/300; 713/330; 700/66
(58) Field of Search ................................ 710/313, 305, 710/73; 713/320, 324, 300, 330, 340; 700/66

(56) References Cited

U.S. PATENT DOCUMENTS

| | | | |
|---|---|---|---|
| 5,928,336 A | | 7/1999 | Takeuchi ...................... 710/1 |
| 6,058,441 A | * | 5/2000 | Shu ............................ 710/100 |
| 6,178,514 B1 | * | 1/2001 | Wood ......................... 713/300 |
| 6,516,418 B1 | * | 2/2003 | Lee ............................. 713/320 |
| 6,697,892 B1 | * | 2/2004 | Laity et al. .................. 710/72 |

FOREIGN PATENT DOCUMENTS

WO    WO 96-13802    5/1996

OTHER PUBLICATIONS

Lynn, K. "Universal serial bus (USB) power management" Sep. 15–17, 1998, Wescon/98 Conference Proceedings, pp. 194–201.*

Lynn, K. "Universal serial bus (USB) power management" Nov. 4–6, 1998, Wescon/97 Conference Proceedings, pp. 434–441.*

"Universal Serial Bus Specification" Revision 1.0, pp. 111–136, Jan. 15, 1996.*

* cited by examiner

*Primary Examiner*—Anthony Knight
*Assistant Examiner*—Thomas Pham
(74) *Attorney, Agent, or Firm*—Armstrong, Kratz, Quintos, Hanson & Brooks, LLP

(57) ABSTRACT

A portable electronic device according to the invention comprises a USB connector 4, a USB controller 6 for executing predetermined data communication processing attendant on data communication with a personal computer 2 connected to the USB connector 4, and a main CPU 7 for executing device operation processing for the usual operation of the device, and is adapted to receive a power supply from the personal computer 2 or an external power source 3 as connected to the USB connector 4. Discriminating between the sources of supply of power, the main CPU 7 causes the USB controller 6 to execute the predetermined data communication processing while power is supplied from the personal computer 2, or executes the usual device operation processing while power is supplied from the external power source 3. This assures more rapid and simplified processing even when the USB connector is used also as a connector for the external power source.

5 Claims, 2 Drawing Sheets

PORTABLE ELECTRONIC DEVICE COMPRISING COMMON SERIAL BUS CONNECTOR

FIELD OF THE INVENTION

The present invention relates to portable electronic devices such as audio players or digital cameras of the portable type, and more particularly to portable electronic devices comprising a common serial bus connector compliant with a common serial bus standard, such as a USB connector conforming to the USB (Universal Serial Bus) standard, for connecting a plurality of peripheral devices in common to a host information processing device.

BACKGROUND OF THE INVENTION

Portable electronic devices such as audio players or digital cameras of the portable type conventionally have incorporated therein a dry cell or secondary cell serving as the power source to realize the portability of the device. In some cases, however, it is desired to connect a commercial a.c. power source or like external power source to such a device and operate the device therewith. This nevertheless entails the problem that the provision of a connector for connecting the external power source to the portable electronic device renders the device greater in size.

In recent years, USB has attracted attention as a universal interface for connecting a plurality of peripheral devices in common to a host personal computer, and studies are underway for providing USB connectors, which are compliant with the USB standard, on various portable electronic devices. The USB connector has a pair of data terminals D+ and D−, power source terminal and ground terminal, and can be used for supplying power to peripheral devices by way of the power source terminal.

Accordingly, it appears feasible to provide the USB connector on a portable electronic device for use with an a.c. adaptor (external power source) connectable to the power source terminal of the USB connector, and to connect the a.c. adaptor to the power source terminal of the USB connector for the supply of power to the device, the USB connector thus serving also as a connector for the connection of the external power source, whereby an increase in the size of the electronic device is avoidable.

However, it is usual practice with the portable electronic device (compliant with the USB standard) having the USB connector to provide a main CPU for executing predetermined device operation processing for various operations of the device including reproduction of data, and a USB controller separate from the main CPU and adapted to execute predetermined data processing for carrying out data communication with the personal computer through the USB connector so as to ensure simplified processing. When the personal computer is connected to the USB connector on the portable electronic device in this case, it is necessary for the USB controller to conduct data communication with the personal computer with a definite period as required by the USB standard, so that the leadership in data processing is taken over by the USB controller from the main CPU. This entails the problem that even if the user gives the portable electronic device a command for data reproduction (play operation), the main CPU is unable to rapidly execute device operation processing for data reproduction.

Further while the USB controller is connected to the personal computer for data communication, some kind of data is handled also between the main CPU and the USB controller. This gives rise to the problem that the main CPU must execute very complicated processing since there is a need for the main CPU to execute device processing for data reproduction in this state.

SUMMARY OF THE INVENTION

Accordingly, an object of the present invention is to provide a portable electronic device which has a USB connector or like common serial bus connector and which is adapted to execute simplified processing at a higher speed even when the connector serves also as a connector for the connection of an external power source.

The present invention provides a portable electronic device comprising a common serial bus connector, a common serial bus controller for executing predetermined data communication processing attendant on data communication with an information processing device connected to the common serial bus connector, and a control circuit connected to the common serial bus controller for executing device operation processing for the usual operation of the electronic device, the electronic device being capable of receiving a power supply from the information processing device or an external power source as connected to the common serial bus connector or from an internal power source.

The control circuit discriminates among the sources of supply of power and causes the common serial bus controller to execute the predetermined data communication processing while power is supplied from the information processing device, or executes the usual device operation processing while power is supplied from the external power source or the internal power source.

With the portable electronic device of the present invention, processing is assigned according to the source of supply of power; the control circuit causes the common serial bus controller to execute the predetermined data communication processing when the information processing device is the power source, or executes the usual device operation processing, such as data reproduction control, when the external power source or the internal power source is the source of supply of power. Thus, the control circuit and the common serial bus controller perform processing as distinctly dividedly assigned thereto according to the source of supply of power. This ensures simplified processing at a higher speed.

Stated more specifically, the control circuit comprises discriminating means for judging which of the information processing device and the external power source is connected to the common serial bus connector, and control means for causing the common serial bus controller to execute the predetermined data communication processing when the connection of the information processing device to the common serial bus connector is recognized, or executes the usual device operation processing when the connection of the external power source to the common serial bus connector is recognized.

The discriminating means identifies the source of supply of power based on the voltage value of the power supply terminal of the common serial bus connector, or identifies the source of supply of power depending on whether the common serial bus controller has started data communication via the common serial bus connector.

According to the former method, the supply voltage of the external power source is made lower or higher than the voltage of the power supply terminal of the common serial bus connector. The difference in the voltage value of the power supply terminal makes it possible to discriminate among the sources of supply of power. Further with the latter method, when the common serial bus controller started data communication via the common serial bus connector within a predetermined period of time, the information processing device is found to be the source of supply of power, whereas if data communication has not been started within the predetermined period of time, the external power source is found to be the supply source. Although the source of power supply can be identified by either of these methods, the former method based on the voltage value permits more rapid discrimination or identification.

Further stated more specifically, the control circuit comprises means for detecting the connection of the information processing device or the external power source to the common serial bus connector based on the binary state (high or low) of voltage level of the power supply terminal thereof, and the discriminating means identifies the source of supply of power according to the result of detection.

The binary state of voltage level of the power supply terminal is changed by the connection of the information processing device or the external power source to the common serial bus connector, so that the control circuit can be initiated into operation from sleep state according to the change to identify the source of supply of power.

As described above, the portable electronic device of the invention having a common serial bus connector is adapted to execute simplified processing at a higher speed even when the connector serves also for the connection of the external power source.

DETAILED DESCRIPTION OF EMBODIMENT

Figure 1:
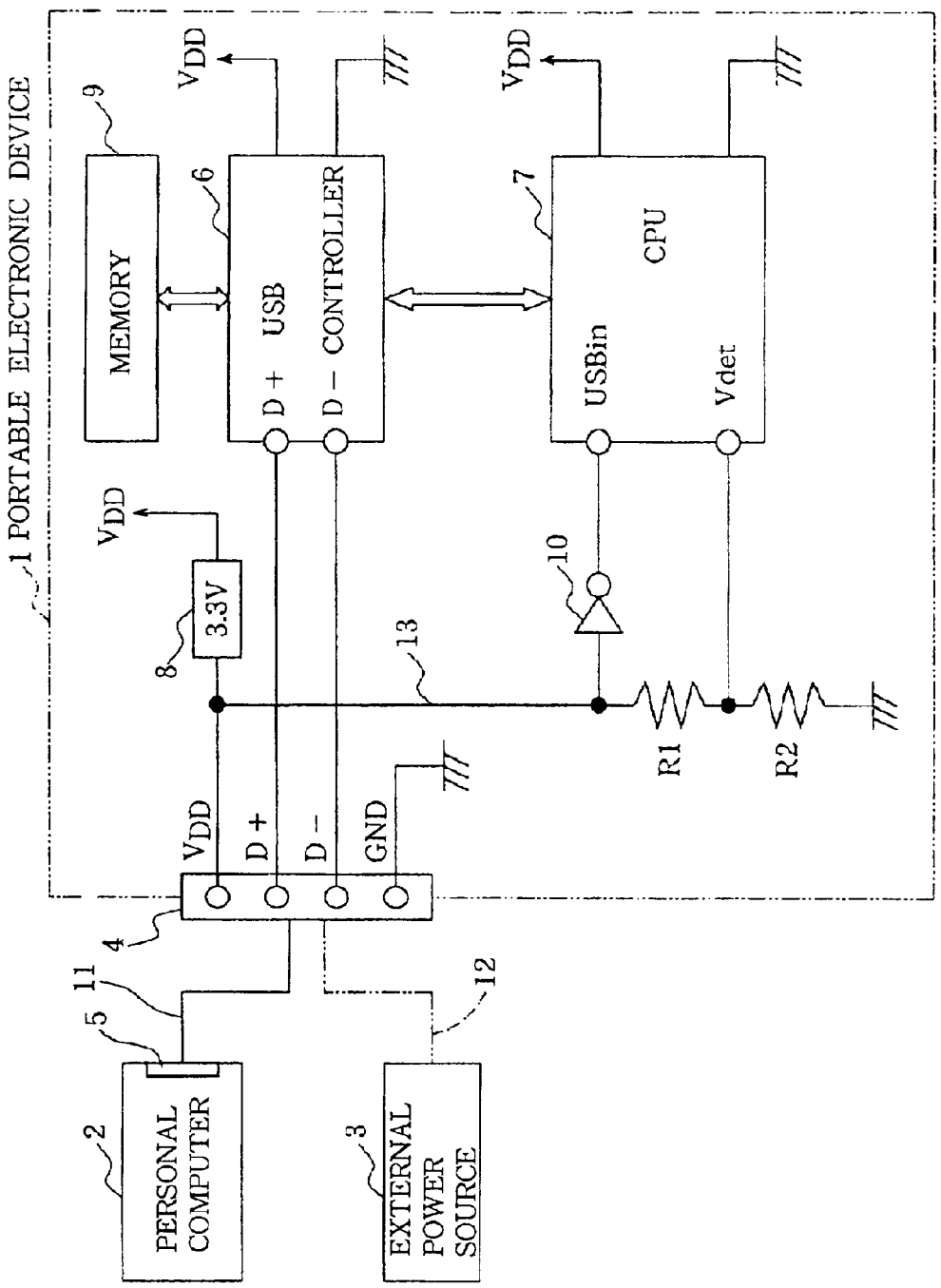
FIG. 1 is a block diagram showing the construction of a portable electronic device embodying the invention.

An embodiment of the present invention will be described below in detail with reference to the drawings. FIG. 1 shows a portable electronic device 1 of the invention, which has a USB connector 4. A USB connector 5 of a personal computer 2 serving as a host can be connected to the USB connector 4 by a USB cable 11, or an external power source 3 such as an a.c. adaptor can be connected to the USB connector 4 by a power source cable 12. The USB connector 4 has a pair of data terminals D+ and D−, a power source terminal $V_{DD}$ and a ground terminal GND.

The portable electronic device 1 comprises a USB controller 6 for executing predetermined data processing for conducting data communication with the personal computer 2 through the USB connector 4, a main CPU 7 for executing predetermined device operation processing for various operations of the device including reproduction of data, and a memory 9 for storing the data downloaded from the personal computer 2.

The pair of data terminals D+ and D− of the USB connector 4 are connected to a pair of data terminals D+ and D− provided on the USB controller 6. The power source voltage obtained from the power source terminal $V_{DD}$ of the USB connector 4 is adjusted to 3.3 V by a voltage regulator 8 and then supplied to the USB controller 6 and the main CPU 7.

When the personal computer 2 is connected to the USB connector 4, the power source voltage to be supplied from the USB connector 5 of the personal computer 2 is prescribed at 4.75 V to 5.25 V. Further when a hub is connected to the USB connector 4 in the case where the personal computer 2, etc. provide a LAN, the power source voltage to be supplied from the hub is prescribed at 4.4 V to 5.25 V.

According to the present invention, on the other hand, the voltage to be supplied from the external power source 3 is set at 4.0 V to 4.3 V. This makes it possible to discriminate between the sources of supply of power as will be described later and to avoid damage to other USB device even if the external power source 3 is connected to the device.

Extending from the power source terminal $V_{DD}$ of the USB connector 4 is a branch line 13 which is connected to inverting means 10 and then to a USB connection detecting terminal USBin provided on the main CPU 7. The branch line 13 has connected thereto a pair of voltage dividing resistors R1 and R2, and an intermediate point between the resistors is connected to a voltage detecting terminal Vdet provided on the main CPU 7.

Figure 2:
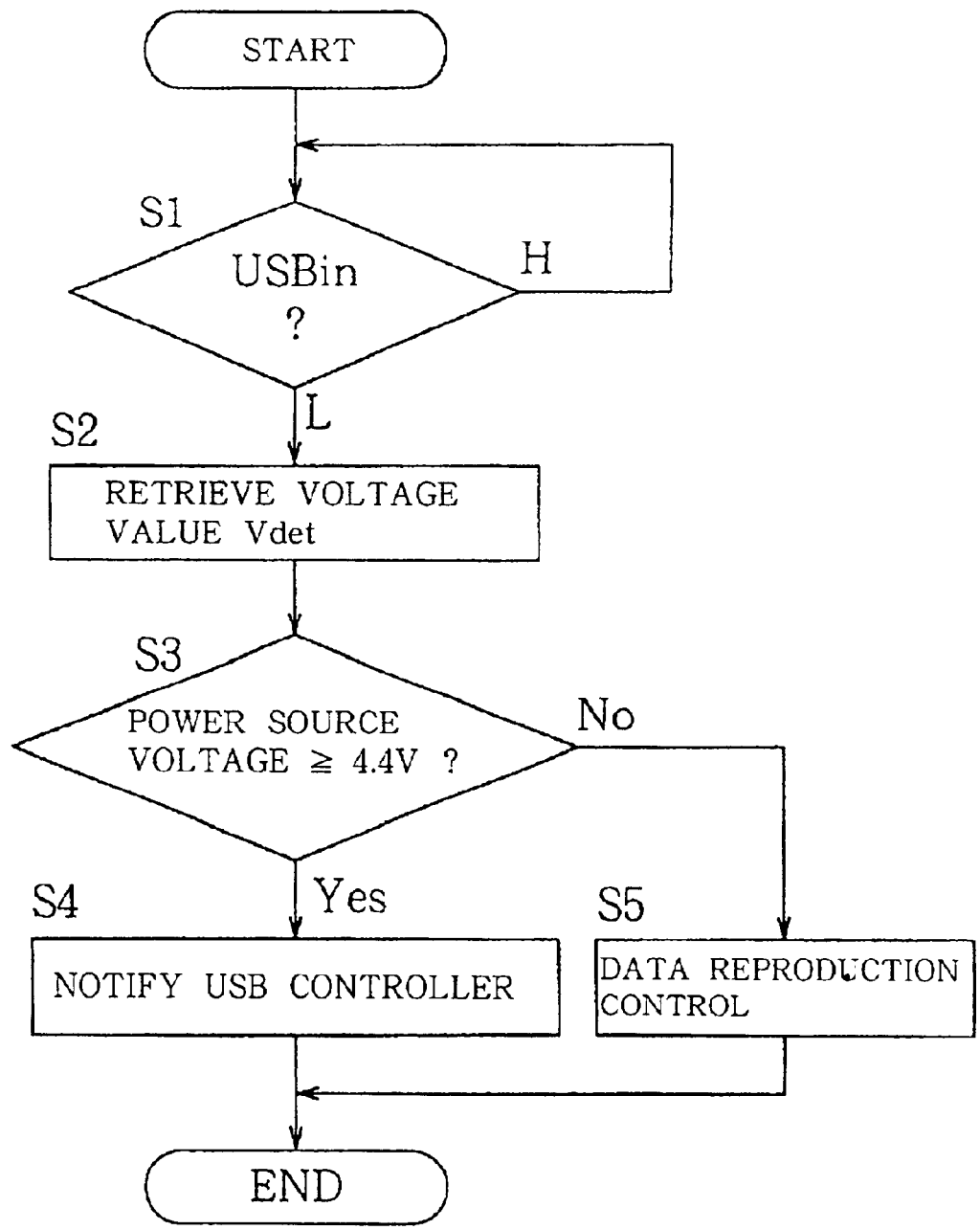
FIG. 2 is a flow chart showing the control procedure to be performed by a main CPU.

FIG. 2 shows the control procedure to be executed by the main CPU 7. First when the personal computer 2 or the external power source 3 is connected to the USB connector 4 of the portable electronic device 1 in step S1, this changes the voltage at the USB connection detecting terminal USBin from high to low, with the result that the main CPU 7 rises from sleep mode.

Subsequently in step S2, the voltage value Vdet is retrieved from the voltage detecting terminal Vdet, and based on this voltage value Vdet, an inquiry is made in step S3 as to whether the power source voltage is at least 4.4 V. When the personal computer 2 or hub is connected to the USB connector 4, the power source voltage is within the range of 4.4 V to 5.25 V, so that the inquiry is answered in the affirmative, followed by step S4. If the external power source 3 is connected to the USB connector 4, on the other hand, the answer is negative since the power source voltage is in the range of 4.0 V to 4.3 V, followed by step S5.

In step S4, the main CPU 7 notifies the USB controller 6 of the connection of the personal computer 2 to the USB connector 4, sets the controller 6 in communication mode and causes the controller 6 to start data communication processing with the personal computer 2.

In step S5, on the other hand, the CPU 7 controls charging of the built-in secondary cell (not shown) as required, and executes device operation processing, such as data reproduction control, in response to the user's manipulation.

Thus, when the personal computer 2 is connected to the portable electronic device of the present invention by means of the USB connector 4, the USB controller 6 is caused to execute only data communication processing assigned thereto, while when the external power source 3 is connected to the device, the main CPU 7 executes only device operation processing assigned thereto. In this way, the processing to be executed is distinctly divided in two. This assures the main CPU 7 of simplified processing at a higher speed.

For example, in the case where the personal computer 2 is connected to the USB connector 4 of the portable electronic device 1 for downloading data from the computer 2 to the electronic device 1, the main CPU 7 entrusts the USB controller 6 with the processing, with the result that the USB controller 6 performs data communication with the computer 2 and stores the data downloaded therefrom via the USB connector 4 in the memory 9.

When the portable electronic device 1 is thereafter given a command to reproduce the data stored in the memory 9, with the external power source 3 connected to the USB connector 4 thereof, the main CPU 7 commands the controller 6 to read the data from the memory 9 and receives the read data to execute device operation processing required for data reproduction. At this time, rapid processing is realized since the main CPU 7 takes the leadership of data processing.

The present invention is not limited to the foregoing embodiment in construction but can be modified variously by one skilled in the art without departing from the spirit of the invention as set forth in the appended claims. For example, the common serial bus connector is not limited to a USB connector in conformity with the USB standard but can be a connector compliant with other standard.

What is claimed is:

1. A portable electronic device comprising
    a common serial bus connector provided with data terminals and a power supply terminal in compliance with a common serial bus standard for connecting a plurality of peripheral devices in common to a host information processing device,
    a common serial bus controller for executing predetermined data communication processing attendant on data communication with an information processing device connected to the common serial bus connector, and
    a control circuit connected to the common serial bus controller for executing device operation processing for the usual operation of the electronic device, the electronic device being capable of receiving a power supply from the information processing device or an external power source as connected to the common serial bus connector or from an internal power source, the portable electronic device being characterized in that the control circuit discriminates among the sources of supply of power and causes the common serial bus controller to execute the predetermined data communication processing while power voltage is greater than or equal to 4.4 volts and is supplied from the information processing device connected to the common serial bus connector, and executes the usual device operation processing while power voltage is less than 4.4 volts and is supplied from the external power source connected to the common serial bus connector.

2. A portable electronic device according to claim 1 wherein the control circuit comprises discriminating means for judging which of the information processing device and the external power source is connected to the common serial bus connector, and control means for causing the common serial bus controller to execute the predetermined data communication processing when the connection of the information processing device to the common serial bus connector is recognized, or executes the usual device operation processing when the connection of the external power source to the common serial bus connector is recognized.

3. A portable electronic device according to claim 2 wherein the discriminating means identifies the source of supply of power based on the voltage value of the power supply terminal of the common serial bus connector.

4. A portable electronic device according to claim 2 wherein the discriminating means identifies the source of supply of power depending on whether the common serial bus controller has started data communication via the common serial bus connector.

5. A portable electronic device according to claim 2 wherein the control circuit further comprises means for detecting the connection of the information processing device or the external power source to the common serial bus connector based on the binary state of voltage level of the power supply terminal thereof, and the discriminating means identifies the source of supply of power according to the result of detection.

* * * * *